July 3, 1962  J. W. BERHMAN  3,041,824
PROPULSION SYSTEM
Filed May 1, 1956

INVENTOR
JOHN W. BERHMAN
BY
Mitchell Archut
ATTORNEYS 3,041,824
PROPULSION SYSTEM
John W. Berkman, Pompton Plains, N.J., assignor to Amalgamated Growth Industries, Inc., New York, N.Y., a corporation of Delaware
Filed May 1, 1956, Ser. No. 581,857
2 Claims. (Cl. 60—35.6)

My invention relates to an improved powerplant for propelling missiles or aircraft.

The need for greater speeds for land, sea and airborne carriers, and for increasingly greater speeds for aircraft and missiles for military applications, has made necessary the development of more powerful powerplants that will be capable of producing speeds for such craft far above any possible with present-day designs. The piston motor has been superseded, to a large extent, by the turbojet motor, and this latter type in turn has been replaced by the rocket motor for certain applications, particularly for comparatively short-range guided missiles, but all such motor developments have fallen short of producing the exhaust-discharge speeds necessary for a very long range missile (e.g. intercontinental ballastic missile), which may be the ultimate weapon required for future, all-out warfare.

It is, accordingly, an object of the invention to provide a new type of powerplant, having potentialities for achieving the extremely high velocities that are necessary for propulsion of missiles, aircraft and the like vehicles.

It is another object to provide a new type of power plant utilizing a continuously discharging electric arc as a substantial heat-development mechanism.

It is a further object to achieve the above objects with electromagnetic means for enhancing the rate of heat development by concentration and acceleration of ionized gas flow.

Figure 1:
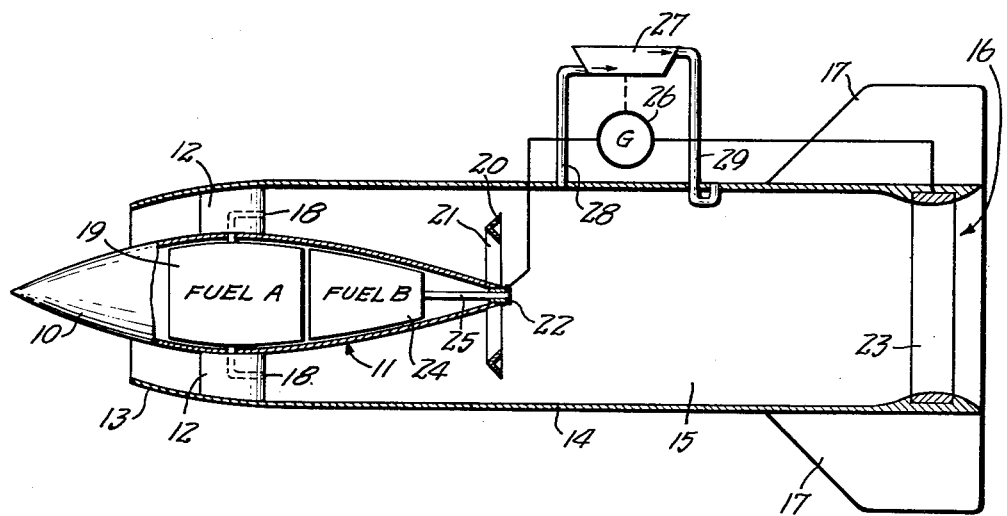
Figure 2:
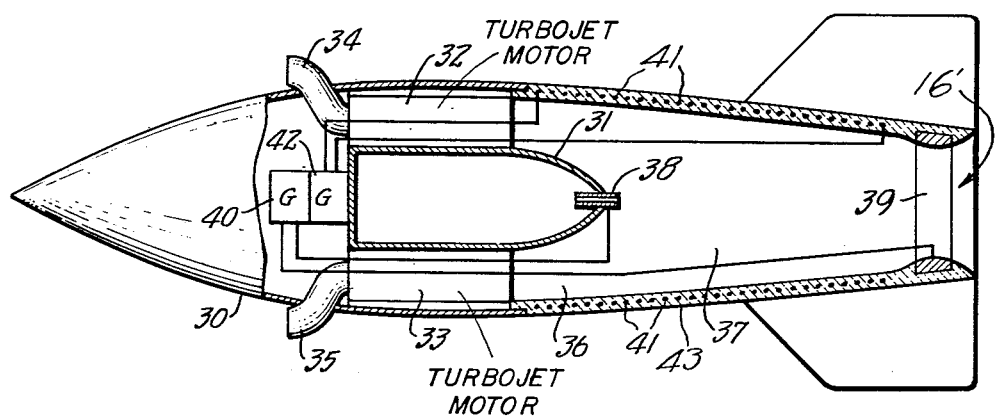

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIGS. 1 and 2 are longitudinal configurations illustrative of alternative forms of the invention.

Briefly stated, my invention contemplates the employment of a continuously discharging electric arc as an important and substantial heat-development mechanism in power plants, as for aircraft, missiles, and the like. Generally speaking, arc development in such case may follow the teachings of the late Alexander Rava, as discussed in greater detail in his copending patent application Serial No. 482,513, filed January 18, 1955, now Patent No. 2,768,279. The resulting so-called Rava arc may be viewed as a secondary or second-stage mechanism for heat development when used in combination with a more conventional powerplant.

For example, in one important form of my invention, I use a conventional powerplant, such as a ramjet, turbojet, rocket or the like to function in its ordinarily understood manner and, in particular to provide a source of hot exhaust gases containing highly ionized and possibly incompletely combusted products. These products are developed in or discharged into the region of arc discharge, and the arc discharge is preferably substantially coaxial with the substantial flow of exhaust products from the primary engine. The gases issuing from the more or less conventional combustion-engine process provide a relatively high temperature floor above which the arc discharge may function to substantially elevate the temperature of these products. Furthermore, the ionized nature of these products simplifies the problem of establishing and maintaining the arc, and further fuel may be added for enhancing the volume of combustion in the arc region. By substantially elevating the heat of the combusted and combusting products within a confining arc chamber, and by then discharging the same to the atmosphere, I provide means whereby substantially greater temperature developments may be achieved with resultant more efficient production of thrust for the higher flight speeds required in extremely long range vehicles.

Referring to FIG. 1 of the drawings, my invention is shown in application to a so-called inner-body ramjet which may be an expendable missile containing a warhead and detection equipment, or the like, within a nose 10 at the forward end of the inner body 11. The inner body 11 may be fixedly mounted on radial struts 12 within the open nose 13 of an elongated tubular body or duct 14. The downstream or exhaust end of the body 14 may be substantially downstream from the downstream end of the inner body 11 so as to define therebetween a combustion chamber 15, terminating at an exhaust nozzle 16. It will be understood that the drawing is purely schematic and very much simplified, and that stabilizing fins 17 attached to the body 14 are shown merely for suggestive purposes.

The configuration of ramjet parts within the body 15 may be one of a variety of forms, but, in the arrangement shown, I provide for fuel injection at nozzles 18 in the trailing edges of the support struts 12, injection being accomplished by pressurized and suitably regulated mechanisms (not shown) supplied by a fuel tank 19 within the inner body 10 and merely schematically collectively designated "Fuel A" in FIG. 1. If desired, flame-holder means, such as an annular gutter 20 supported on struts 21 may serve to anchor flame development near the base or downstream end of inner body 11. It will be understood that with the parts thus far described, and under conditions of ordinary ramjet-powered flight, a steady and substantial combustion development occurs within the chamber 15, said development being characterized by strong ionization of the gaseous particles involved.

In accordance with a feature of the invention, I substantially enhance the development of heat within the chamber 15 by establishing a continuous arc discharge throughout the ionized region contained within chamber 15, and preferably extending substantially to the exhaust outlet 16. In the form shown, such discharge takes place between an upstream electrode 22 and a downstream electrode 23. The downstream electrode is shown as a conducting ring insert fitting into the thrust section of the exhaust nozzle 16, which may be of metal or of refractory material, it being understood that electrode 23 is preferably electrically insulated from the combustion chamber wall 15 by means not shown. The upstream nozzle 22 may be a solid piece of tungsten or of high-temperature alloy, but, in the form shown, the electrode 22, although relatively small, is hollow so as to permit the supply of auxiliary fuel from a further tank 24 contained within the inner body 11. The legend suggests that the connection 25 supplies Fuel B from the tank 24 through the upstream nozzle 22 and discharging centrally into the arc plasma; flow-control means for the supply of Fuel B is not shown but will be understood to be provided as necessary to assure desired metering throughout flight.

Power for the development of an arc discharge may be derived from an auxiliary power supply, such as an auxiliary power plant (e.g. a gas turbine), but, in the form shown, a generator 26 is driven by a turbine 27 operating on the differential pressure between combustion-chamber pressure, as sampled by line 28, and external atmospheric pressure, as sampled by line 29. As indicated, the showing of the parts is purely schematic, and it will be understood that the parts 26—27—28—29 are suitably housed and disposed so as not to interfere with the substantial gas flows and slip-stream conditions occurring in flight.

In use, the conventional ramjet regime of my powerplant will be understood to develop continuous substantial combustion and generation of ionized particles within the chamber 15. When the arc is struck between electrodes 22—23, substantially greater heat will be developed in these ionized particles and even further heat may be developed by the discharge of Fuel B via line 25 into the center of the arc discharge. The function of the arc is to substantially elevate the temperature of products which are to be discharged into the atmosphere, the elevated temperature being substantially above the relatively high level associated with conventional ramjet operation. Such higher temperatures entail development of greater pressures and greater exhaust velocities, making possible the achievement of higher thrusts and propulsive speeds for the vehicle.

Referring to FIG. 2, my invention is shown in application to a slightly different vehicle comprising an outer body 30 and an inner body or chamber 31. Surrounding the inner body 31 and still contained within the outer body 30 is a plurality of conventional engines, such as turbojet motors 32—33 operating from a fuel supply which may be contained within the inner body 31, but which is not shown in detail. Air inlets for the turbojet motors 32—33 may be provided as lateral inlet scoops 34—35. The turbojet motors 32—33 will be understood to provide hot exhaust products in the annular diffuser region 36 near the downstream end of the inner body 31. These exhaust products will not only include a high concentration of ionized particles, but there will be a certain proportion of excess uncombusted oxygen from the air, and these products will be discharged into the combustion chamber region 37 for a second stage of combustion.

In accordance with the invention, the region of second stage of combustion occurs between upstream and downstream electrodes 38—39 corresponding to those described at 22—23 in FIG. 1, and in view of the fact that the exhaust products from the turbojets 32—33 include uncombusted oxygen, it is desirable to introduce oxidizable fuel through the central opening in the upstream electrode 38; again, automatic metering means (not shown) may be provided as necessary in the supply of fuel through electrode 32. Electric power for exciting the electrodes 38—39 may be derived from a generator, shown schematically at 40; generator 40 may be operated from an auxiliary power plant or in the manner described for generator 26 in FIG. 1.

In accordance with a further feature of the invention, I employ electromagnetic means acting on the ionized particles not only to concentrate or centrally focus the flow of ionized products, but also to accelerate the same. The necessary field may be established by exciting a winding carried by the wall of the combustion chamber 37; in the drawing this winding is merely shown schematically by a succession of dots 41 representing intercepts of the various turns of the winding, and for insulation purposes the combustion-chamber wall section 43 may be of refractory material. The winding 41 may be excited by auxiliary generator means 42 and preferably extends for substantially the full longitudinal length over which ionized products are available.

It will be seen that I have disclosed a significantly improved powerplant organization whereby very substantially elevated temperature developments are achieved. In the use of an elongated electric arc discharging generally along the axis of predominant gas flow, a maximum opportunity is afforded for heat development for all the flow products, whether already wholly or partially combusted in and issuing from the primary stage, or combusting by virtue of fuel injection at the arc stage. If the fuel injected at the electrode (22 or 38) is electrically conductive, and if it is injected at a sufficient flow rate, the upstream end of the arc will tend to attach itself to the fuel and not to electrode (22 or 38), so that the fuel itself becomes the upstream electrode, and corrosive action on the solid electrode parts (22 or 38) is avoided or substantially reduced. Because the products are so strongly ionized in the arc-combustion chamber, electromagnetic forces may be applied to these products to centrally focus and accelerate the same, thus enhancing the discharge of exhaust products at 16 or 16' and reducing corrosive effects on the combustion chamber and exhaust nozzle.

While I have described my invention in detail for the preferred forms shown, it will be understood that the modifications may be made within the scope of the invention as defined in the claims which follow.

I claim:

1. A power plant comprising a ramjet including an elongated duct open at both ends, a combustion chamber within said duct and discharging at the downstream end of said duct, means for supplying and burning fuel with the air admitted at the inlet end of said duct, whereby hot ionized products may be developed within said combustion chamber, and means for establishing an elongated continuous electric arc along substantially the length of said combustion chamber, said means for establishing an electric arc comprising an annular downstream electrode contained within said combustion chamber near the downstream end thereof, a substantially central upstream electrode, said upstream electrode having a central opening therein, means for establishing a continuously discharging electric arc between said electrodes, and means for supplying fuel through said central opening and therefore directly into the center of the arc discharge.

2. A propulsion plant comprising a first combustion power-plant stage having means for burning a combustible fuel and for discharging the same out one end thereof, a second power-plant stage comprising an elongated combustion chamber receiving the exhaust products of said first stage at one end thereof and having an opening for discharge of exhaust products at the other end thereof, upstream and downstream electrodes within said combustion chamber, said downstream electrode being annular and contained within said combustion chamber near the downstream end thereof, means for establishing a continuous electric arc between said electrodes, said upstream electrode having a central opening therein and means for supplying fuel through said central opening.

References Cited in the file of this patent

UNITED STATES PATENTS

| | | |
|---|---|---|
| 933,094 | Moscicki | Sept. 7, 1909 |
| 2,585,810 | Mallinckrodt | Feb. 12, 1952 |
| 2,587,331 | Jordan | Feb. 26, 1952 |
| 2,603,945 | Brown | July 22, 1952 |
| 2,672,727 | Brown | Mar. 23, 1954 |
| 2,721,444 | Johnson | Oct. 25, 1955 |
| 2,725,718 | Sheets et al. | Dec. 6, 1955 |
| 2,728,408 | Deliman | Dec. 27, 1955 |
| 2,763,125 | Kadosch et al. | Sept. 18, 1956 |
| 2,766,582 | Smith | Oct. 16, 1956 |
| 2,768,279 | Rava | Oct. 23, 1956 |
| 2,826,708 | Foster | Mar. 11, 1958 |
| 2,921,892 | Casey | Jan. 19, 1960 |